Figure 1A:
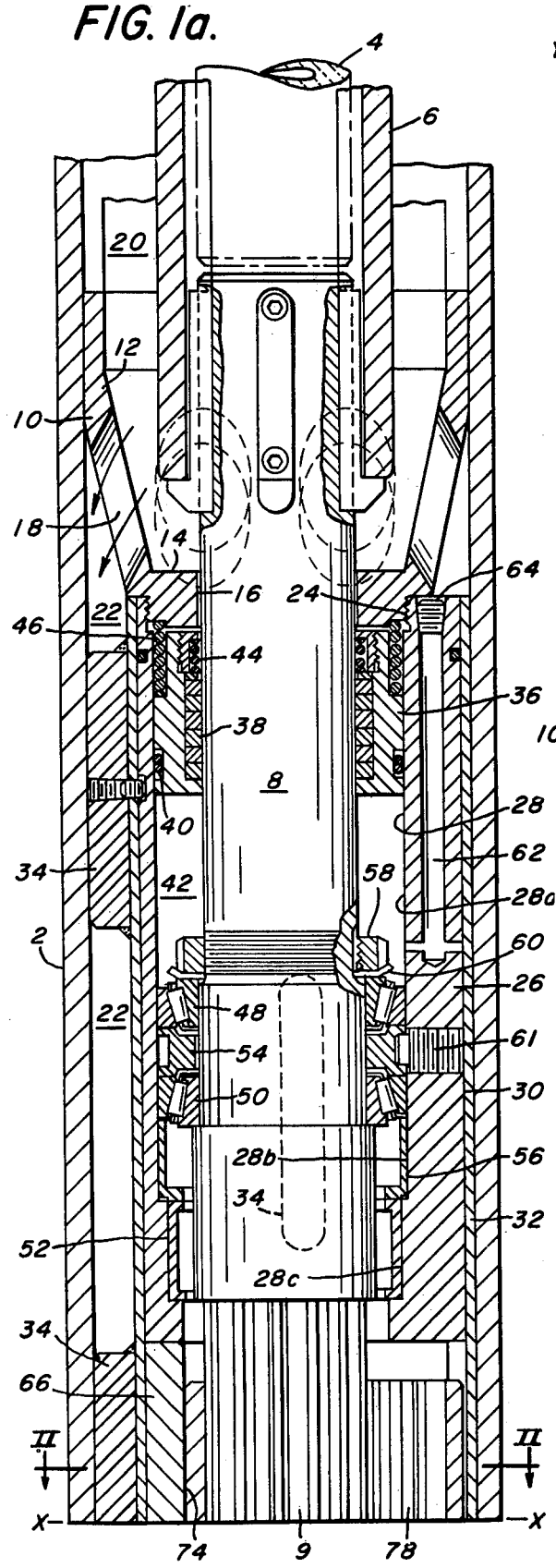
Figure 1C:
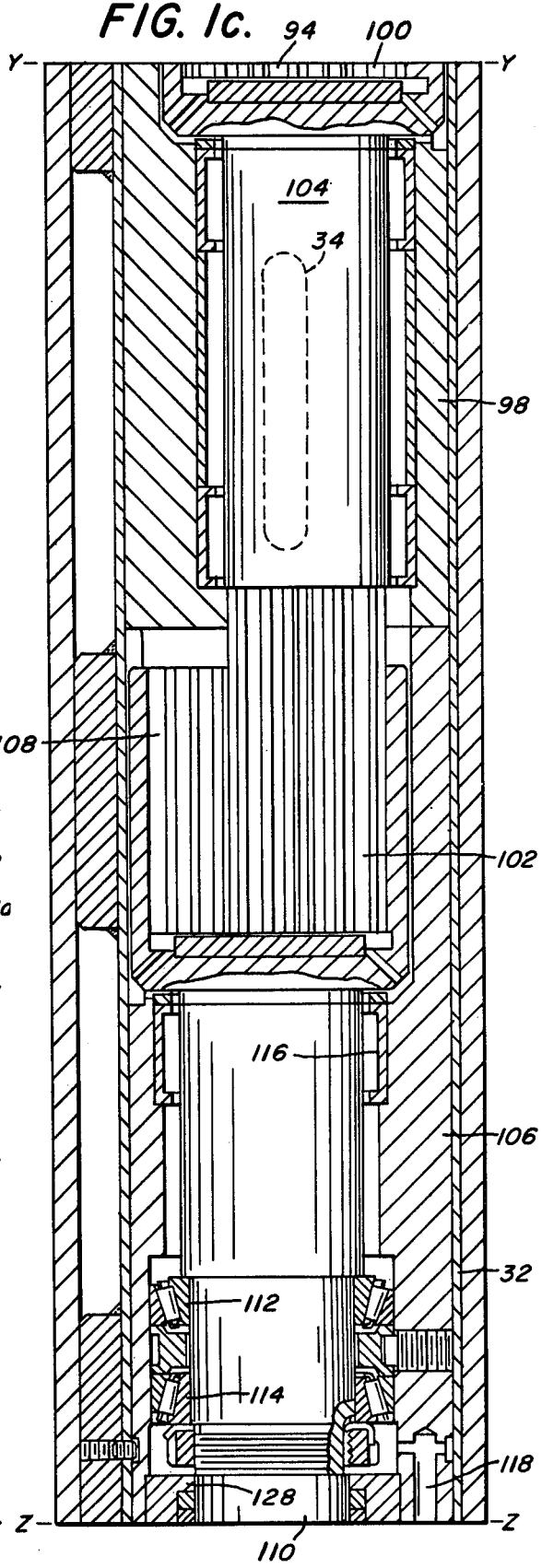

United States Patent [19]

Garrison

[11] 4,090,574
[45] May 23, 1978

[54] GEAR SYSTEM FOR AN OIL WELL DRIVE

[75] Inventor: Marion A. Garrison, Denver, Colo.

[73] Assignee: Empire Oil Tool Company, Denver, Colo.

[21] Appl. No.: 730,399

[22] Filed: Oct. 7, 1976

Related U.S. Application Data

[62] Division of Ser. No. 568,496, Apr. 16, 1975, abandoned.

[51] Int. Cl.² .......................... E21B 5/00; F16H 1/10; F16H 1/20
[52] U.S. Cl. ..................................... 175/106; 74/804; 74/421 R
[58] Field of Search ................. 74/804, 801, 412, 413, 74/414, 421, 438, 640, 655; 415/122 R, 122 A, 502, 503; 175/106, 319, 91

[56] References Cited

U.S. PATENT DOCUMENTS

| | | | |
|---|---|---|---|
| 1,456,681 | 5/1923 | Schepp et al. | 175/106 X |
| 1,773,915 | 8/1930 | Lydon | 175/106 X |
| 1,790,460 | 1/1931 | Capeliuschnicoff | 175/106 |
| 1,814,296 | 7/1931 | Dean | 175/319 |
| 2,040,287 | 5/1936 | Ware | 74/413 |
| 2,715,344 | 8/1955 | Arutunoff | 74/801 |
| 2,937,008 | 5/1960 | Whittle | 175/106 X |
| 3,754,835 | 8/1973 | Ivanov et al. | 415/122 |

FOREIGN PATENT DOCUMENTS

| | | | |
|---|---|---|---|
| 148,764 | 5/1962 | U.S.S.R. | 175/106 |

Primary Examiner—Benjamin W. Wyche
Assistant Examiner—Lance W. Chandler

[57] ABSTRACT

A reduction gear system includes a pair of sets of meshing pinions and internal gears having a substantially larger diameter than the pinions, a shaft connecting the internal gear of the first set to the pinion of the second set, a second shaft supporting the pinion of the first set, a third shaft supporting the internal gear of the second set, the axes of said second and third shafts being in alignment and parallel to but spaced from the axis of the first shaft. Additional parts of sets may be connected to the first pair. When used between the motor and drill bit of an oil well drill the shafts, pinions and gears are supported in an inner housing within an outer housing with a fluid mud passageway therebetween. The inner housing includes a grease chamber and the pressure of the grease is kept greater than the mud pressure by means of a piston surrounding the shaft at the top of the housing. The top of the top piston and bottom of the lower piston are exposed to the fluid mud and springs provide additional force urging the pistons toward one another.

2 Claims, 5 Drawing Figures

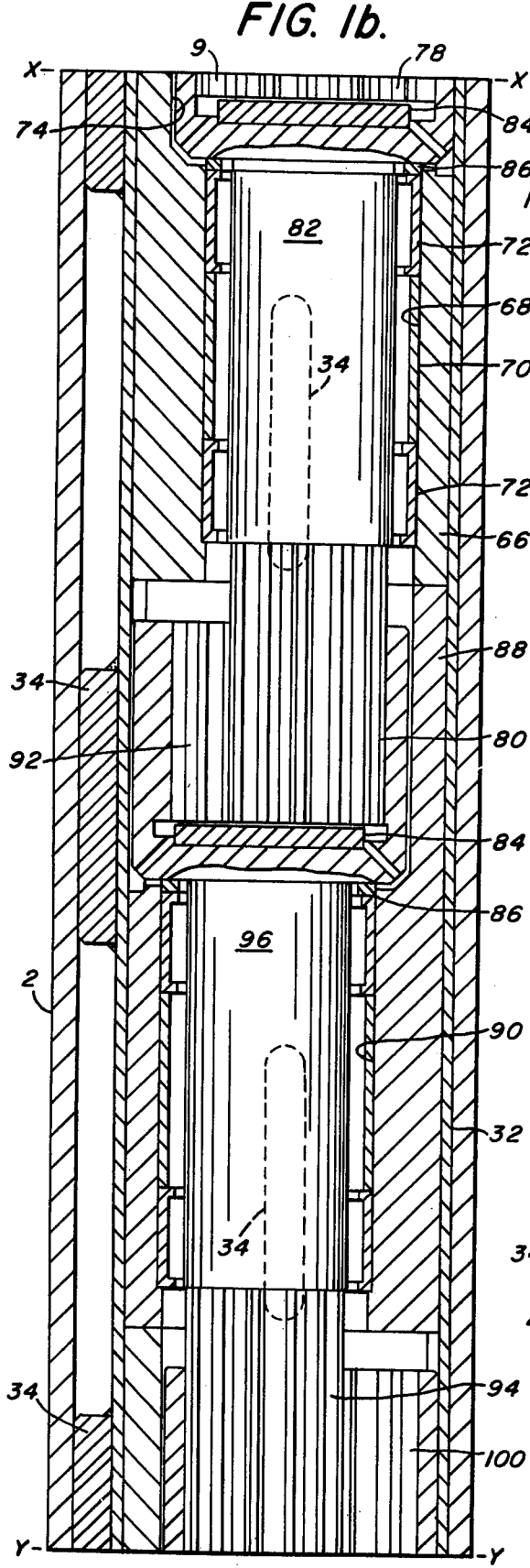

GEAR SYSTEM FOR AN OIL WELL DRIVE

This is a division of application Ser. No. 568,496 filed Apr. 16, 1975, now abandoned.

This invention relates to a gear system for use between axially aligned input and output shafts and more particularly to such a gear system for use between the motor shaft and drill bit used in deep oil well drilling. Normally, there is a direct connection between the motor shaft and drill bit so that they rotate at the same angular velocity. Such apparatus is shown in my U.S. Pat. Nos. 2,852,230 dated Sept. 16, 1956; 3,076,514 dated Feb. 5, 1963; and 3,594,106 dated July 20, 1971. Under certain circumstances, it is desirable to rotate the drill bit at a slower speed than the motor. In most cases, there are severe limitations as to the diameter of the apparatus which can be used. For example, only a six inch diameter space may be available. Because of this space limitation and also because of the severe operating conditions such as caused by high temperatures, high loads and the drilling mud, the ordinary reduction gearing of which I have knowledge are not suitable. For example, planet gearing of the restricted size necessary would require small delicate pinions with weak teeth. It is also desirable to be able to provide a range of speed reductions instead of being limited to a single reduction. The gear system must be simple and rugged and be able to withstand substantial compressive loads. The drilling mud must be kept out of the gear system and adequate lubrication must be provided. This also requires that the drilling mud bypass the gear system.

It is therefore an object of my invention to provide a gear system which is small in transverse cross section and which is rugged and strong.

Another object is to provide such a gear system which is particularly suited for use between the motor and bit in deep well drilling.

Still another object is to provide such a gear system which is well lubricated and which prevents leakage of drilling mud into the system while permitting by-pass of the drilling mud around the gear system.

A further object is to provide such a system which may be connected in tandem to permit more than one range of reduction.

A still further object is to provide such a system which is simple in construction and is relatively cheap to manufacture and maintain.

These and other objects of the invention will become apparent after referring to the following detailed description and attached drawings in which:

FIGS. 1a, 1b, 1c and 1d when connected on lines X—X, Y—Y and Z—Z is a longitudinal sectional view of the apparatus of my invention; and FIG. 2 is a sectional view taken on line II—II of FIG. 1a.

Referring more particularly to FIGS. 1a and 2 of the drawings reference numeral 2 indicates the outer housing of a motor, preferably a deep oil well motor such as shown in my copending applications Ser. No. 545,866 filed Jan. 31, 1975, entitled "Fluid Driven Motor Having Improved Blade Construction" and Ser. No. 556,079 filed Mar. 6, 1975, entitled "Inlet and Outlet Ports and Sealing Means For A Fluid Driven Motor". The motor (not shown in detail) has a shaft 4, the lower end of which is connected by a coupling 6 to a pinion shaft 8 having a pinion 9 at its lower end. A spacer 10 is attached to the inside of housing 2 and has an inwardly extending frusto-conical portion 12 and an inner ring portion 14 providing a small circumferential opening 16 around shaft 8. A plurality of spaced apart openings 18 in portion 12 permits flow of fluid drilling mud from passageway 20 to passageway 22. External threads 24 are provided on inner ring portion 14 for receiving an eccentric bushing 26. Bore 28 of bushing 26 has a main portion 28a of a maximum diameter, an intermediate diameter portion 28b and a minimum diameter portion 28c, all coaxial with pinion shaft 8. The outside surface 30 of bushing 26 is cylindrical with its axis parallel to but spaced from its bore axis. A tube 32 of uniform wall thickness closely surrounds the outer surface 30. The bushing 26 is held in fixed position by means of centering keys 34 spaced at 90° stations and by contact of tube 32 with housing 2 at the remaining 90° station as best shown in FIG. 2. The centering keys are of substantially less length than bushing 26 and there are a plurality of axially aligned spaced apart keys at each station. The tube 32 extends substantially the full length of the assembly. An anti-rotation lug 35 is welded to the inside of housing 2. It will be seen that passageway 22 is provided between housing 2 and tube 32.

A piston 36 surrounds shaft 8 and extends to bushing 26 adjacent ring 14. Packing 38 and 40 is provided to prevent passage of drilling mud past the piston. Spring 44 is provided to keep the packing 38 tight. To insure that the pressure of grease in grease chamber 42 is at least as great or greater than the pressure of the drilling mud, spring 46 is provided to urge the piston 36 away from its upper or entry end. Preferably the pressure is increased by 4 or 5 pounds. The shaft 8 is rotatably mounted in bushing 26 by means of bearings 48, 50 and 52 which are separated by spacers 54 and 56 and held in axial position between the shoulder at the junction of portions 28b and 28c of the bushing bore and lock nut 58 and lock washer 60 on shaft 8. The spacer 54 is held in place by means of screw 61. Grease is provided to grease chamber 42 and to the gearing system through passageway 62 in bushing 26. A plug 64 is threaded into the outer end of passageway 62.

A second eccentric bushing 66 having the same outside diameter as eccentric bushing 26 is mounted in tube 32 in abutting relationship with bushing 26. The main bore 68 (FIG. 1b) of bushing 66 has its axis offset with but parallel to the axis of pinion 9. A spacer 70 is positioned in bore 68 between bearings 72. Bore 74 at the upper end of bushing 66 has an enlarged diameter with a cut out portion therein to receive an internal gear 78 which meshes with pinion 9. A second pinion 80 is connected to gear 78 by shaft 82 integral therewith. A bronze thrust washer 84 is mounted between the face of pinion 9 and bushing 66 and a bronze washer 86 is positioned within bore 68 at the upper end thereof.

A third eccentric bushing 88 is mounted in tube 32 in abutting relationship with eccentric bushing 66. The axis of its bore 90 is in alignment with the axis of pinion 9 but otherwise the construction and bearing arrangement is similar to that of eccentric bushing 66 and will not be described in detail. A second internal gear 92 is received in the upper end of bushing 88 and is connected to a third pinion 94 by means of shaft 96 integral therewith.

A fourth eccentric bushing 98 (FIG. 1c) which is functionally the same as the second eccentric bushing 66 is mounted in abutting relationship with eccentric bushing 88. A third internal gear 100 is received in the upper end of bushing 98 and is connected to a fourth pinion 102 by means of shaft 104 integral therewith.

A fifth or output bushing 106 is mounted in the output end of tube 32 in abutting relationship with bushing 98. A fourth internal gear 108 is mounted in the upper end of bushing 106 and is connected to an output shaft 110 having its axis in alignment with the axis of pinion 9. The shaft 110 is mounted in bearings 112, 114 and 116 in a manner similar to shaft 8. A grease passageway 118 having a plug 120 (FIG. 1d) at its outer or lower end is provided at the output end of bushing 106. A spacer 122 similar to spacer 10 is attached to the inside of housing 2 and is threaded to bushing 106 at 124 with a small circumferential opening 126 being provided between spacer 122 and shaft 110 for admission of drilling mud. A packing gland 128 surrounds shaft 110 and extends to bushing 106 at the output end thereof. A spring 130 bears against packing 131 to keep it tight.

The number of reduction stages may be greater or less than that shown. In all cases, however, at least a pair of sets of meshing pinions and internal gears will be used with a shaft connecting the internal gear of the first set to the pinion of the second set, a second shaft supporting the pinion of the first set and a third shaft supporting the internal gear of the second set.

The output shaft 110 may be connected to a drill bit 132 (not shown in detail) in case of deep well drilling or to other devices in other uses.

To assemble, each eccentric bushing first is assembled with all its parts in place including the bearings and shafts. It will be seen (FIG. 2) that each eccentric bushing has a pair of keyways 34a therein which extend the full length thereof. The eccentric bushings are then slid one by one over the keys 34 welded into tube 32. It will be seen that the assembled eccentric bearings form an inner housing.

The entire system within the tube 32 is grease tight with openings to the various bearings and moving parts. The plug 64 is removed and grease pumped into the system. Plug 120 will be removed to permit escape of the air from the system. The plugs are then replaced with the grease being under pressure. In operation in a well the drilling mud will act against the piston 36 to drive it downwardly. Additional pressure is applied to the piston 36 and grease by spring 46 to insure that the grease pressure is greater than the mud pressure so that any leakage will be grease from the system rather than mud into the system.

While there has been shown and described one embodiment, it is to be understood that various adaptations and modifications may be made within the scope of the invention.

I claim:

1. In an oil well drive having an outer housing, a fluid driven motor having a shaft coaxial with said outer housing, and a drill bit within said outer housing and driven by said motor; the improvement of a reduction gear system between said motor shaft and said drill bit; said reduction gear system comprising an upper spacer connected to said outer housing adjacent said motor shaft, a lower spacer connected to said outer housing adjacent said drill bit, each of said spacers having an outer cylindrical portion engaging said outer housing, an externally threaded inner ring portion on the end adjacent the other spacer and a portion extending inwardly from said cylindrical portion to said ring portion, said inwardly extending portion having a plurality of holes therethrough, an elongated tube within said outer housing extending between said spacers, said tube having an outside diameter substantially less than the inside diameter of said housing, a plurality of keys fastened to and extending through the wall of said tube and spaced apart longitudinally at a plurality of stations around its periphery, said tube being held in fixed position in said housing by said keys with the tube contacting said housing at one longitudinal line, a passageway for said motor fluid between said tube and housing communicating with said openings in said spacers, a pair of sets of meshing pinions and internal gears having a substantially larger diameter than the pinions, a shaft connecting the internal gear of the first set to the pinion of the second set, a second shaft supporting the pinion of the first set, a third shaft supporting the internal gear of the second set, the axes of said second and third shafts being in alignment and parallel to but spaced from the axis of the first shaft, a plurality of eccentric bushings one for each reduction gear shaft mounted within said tube in abutting end to end relationship, threads on the top eccentric bushing engaging the threads on the top spacer, threads on the lowest eccentric bushing engaging the threads on the lower spacer, keyways in said eccentric bushings for receiving at least some of said keys, bearings in said eccentric bushings for supporting their respective shafts, the top reduction gear shaft being connected to said motor shaft, the lowest reduction gear shaft being connected to said drill bit, a piston surrounding said top shaft and having an opening from its top end to the pressure of said motor fluid, a spring urging said piston downwardly, a grease chamber between the adjacent ends of said spacers and having openings therefrom at each end, and means for closing said last named openings.

2. The combination of claim 1, including at least one additional pair of sets of meshing opinions and internal gears, the pinion of the first set of each pair being mounted on the shaft supporting the internal gear of the second set of the next preceeding pair, and an eccentric bushing for each of said additional shafts.

* * * * *